(12) United States Patent
Melton et al.

(10) Patent No.: US 6,690,867 B2
(45) Date of Patent: Feb. 10, 2004

(54) OPTICAL INTERCONNECT ASSEMBLIES AND METHODS THEREFOR

(75) Inventors: Stuart R. Melton, Hickory, NC (US); Scott M. Torrey, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/943,996

(22) Filed: Aug. 31, 2001

(65) Prior Publication Data

US 2003/0044141 A1 Mar. 6, 2003

(51) Int. Cl.⁷ .................................................. G02B 6/44
(52) U.S. Cl. ....................................................... 385/114
(58) Field of Search ................................. 385/102, 114, 385/104

(56) References Cited

U.S. PATENT DOCUMENTS

| | | | | |
|---|---|---|---|---|
| 4,900,126 A | * | 2/1990 | Jackson et al. | 385/114 |
| 5,675,686 A | * | 10/1997 | Rosenmayer et al. | 385/114 |
| 5,682,672 A | | 11/1997 | Taniguchi et al. | 29/748 |
| 5,703,973 A | * | 12/1997 | Mettler et al. | 385/52 |
| 5,737,467 A | | 4/1998 | Kato et al. | 385/92 |
| 5,754,721 A | | 5/1998 | Pan | 385/60 |
| 5,905,828 A | | 5/1999 | Jungerman | 385/31 |
| 5,937,133 A | | 8/1999 | Moss et al. | 385/137 |
| 5,945,173 A | * | 8/1999 | Hattori et al. | 427/385.5 |
| 6,004,042 A | * | 12/1999 | Million et al. | 385/59 |
| 6,101,423 A | | 8/2000 | Csipkes et al. | 700/117 |
| 6,118,917 A | | 9/2000 | Lee et al. | 385/49 |
| 6,160,614 A | | 12/2000 | Unno | 356/73.1 |
| 6,269,210 B1 | | 7/2001 | Yagi et al. | 385/114 |
| 6,370,293 B1 | * | 4/2002 | Emmerich et al. | 385/114 |
| 6,421,487 B1 | * | 7/2002 | Hutton et al. | 385/114 |
| 2002/0131719 A1 | * | 9/2002 | Grois et al. | 385/59 |

FOREIGN PATENT DOCUMENTS

| | | | | |
|---|---|---|---|---|
| EP | 0953857 A1 | 11/1999 | ............ | G02B/6/44 |
| EP | 1065544 A2 | 1/2001 | ............ | G02B/6/44 |

OTHER PUBLICATIONS

USCONC document from Internet Site dated Jun. 28, 2001.
USCONC document entitled "Concours optical Circuits" dated Jun. 2001.
"Corning SMF–28 Optical Fiber Product Information" dated Apr. 2001.
"Riser Ribbon Interconnect Cables" dated Feb. 2001.
MM29 "Corning Optical Fiber Measurement Method—Coating Geometry" dated Mar. 2000.
MM15 "Corning Optical Fiber Measurement Method—Cutoff Wavelength" dated Feb. 2000.
MM16 "Corning Optical Fiber Measurement Method—Mode-field Diameter" dated Feb. 2000.
MM28 "Corning Optical Fiber Measurement Method—Glass Geometry—Glass Geometry" dated Jan. 2000.

\* cited by examiner

*Primary Examiner*—Javaid H. Nasri
(74) *Attorney, Agent, or Firm*—Michael E. Carroll, Jr.

(57) ABSTRACT

A single-mode optical fiber includes a core, a cladding, and a coating. The cladding of the single-mode optical fiber has an outer diameter of about 125.0 $\mu$m$\pm$0.3 $\mu$m. A plurality of the single-mode optical fibers may be associated with at least one flexible polymeric material forming an fiber optic assembly and a method of manufacturing the same. The fiber optic assembly, for example, may be a ribbon, a cable, a pigtail, an optical circuit, or a portion of a ribbon stack. Additionally, the optical fiber may include other suitable geometric properties and/or characteristics, such as, a core to cladding concentricity of about 0.2 $\mu$m or less and/or a mode-field diameter of about 9.2 $\mu$m$\pm$0.3 $\mu$m at a source wavelength of 1310 nm.

67 Claims, 3 Drawing Sheets

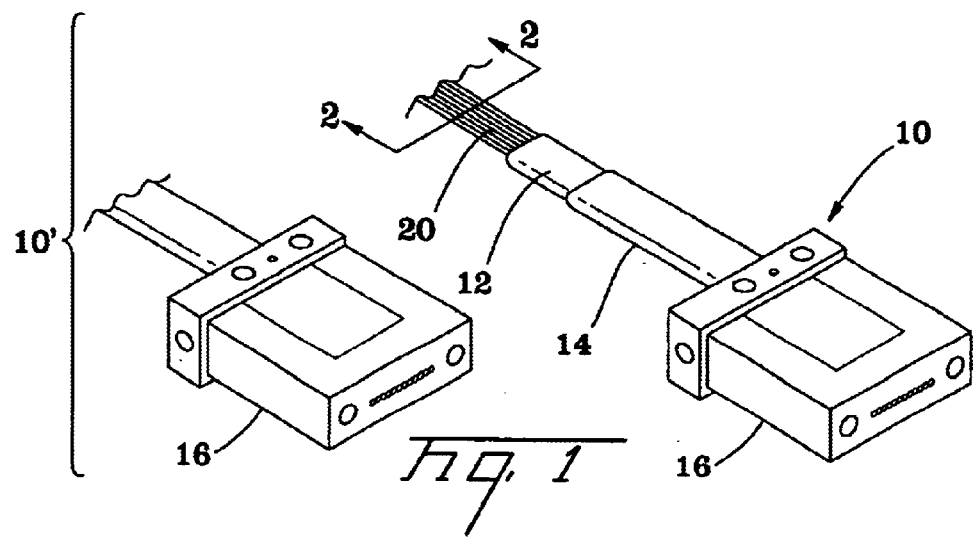
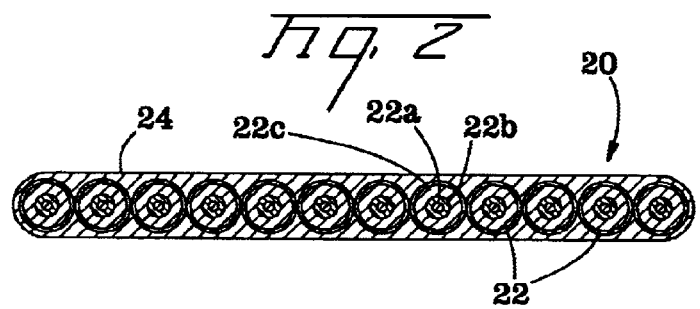
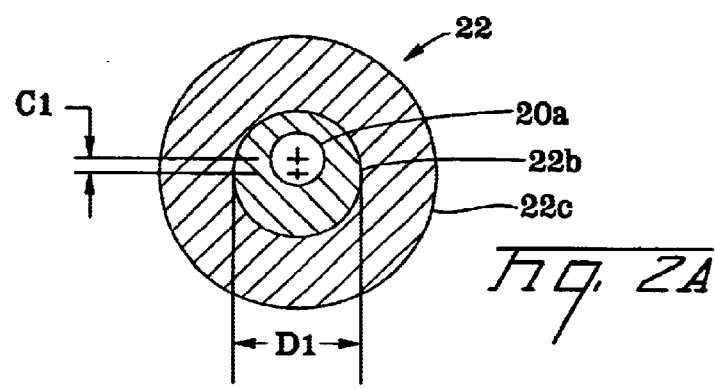

OPTICAL INTERCONNECT ASSEMBLIES AND METHODS THEREFOR

FIELD OF THE INVENTION

The present invention relates to optical interconnect components and/or assemblies and, more particularly, to high performance optical interconnect components and/or assemblies.

BACKGROUND OF THE INVENTION

Optical communication systems include optical fibers that transmit signals, for example, voice, video and/or data information. Optical fibers are capable of transmitting signals over a long distance with relatively small losses. Optical fibers preferably include a silica-based core that is operative to transmit light and is surrounded by a silica-based cladding generally having a lower index of refraction than the core. Generally, a soft primary coating surrounds the cladding, and a relatively rigid secondary coating surrounds the primary coating. Optical fibers can be single-mode or multi-mode and are, for example, commercially available from Corning Inc. of Corning, N.Y.

For practicality, optical communication systems require interconnects or jumpers between optical fibers and optical equipment and/or other optical fibers for quickly and conveniently connecting sections of fiber together, and rearranging if necessary. For example, a jumper cable may interconnect an optical cable with a transmitter or a receiver.

SUMMARY OF THE INVENTION

The present invention is directed to a fiber optic assembly including a plurality of single-mode optical fibers, the plurality of single-mode optical fibers having a core, a cladding, and a coating, at least one flexible polymeric material, the flexible polymeric material being associated with at least a portion of the plurality of single-mode optical fibers, and the plurality of single-mode optical fibers having a cladding outer diameter of about 125.0 $\mu$m±0.3 $\mu$m.

The present invention is also directed to a fiber optic ribbon including eight single-mode optical fibers, the eight single-mode optical fibers having a core, a cladding, and a coating, the eight single-mode optical fibers being associated with a curable matrix, a width of the ribbon being about 2172 $\mu$m or less, a height of the ribbon being about 360 $\mu$m or less, the ribbon having a planarity of about 50 $\mu$m or less, the ribbon having distal single-mode optical fibers, the distal single-mode optical fibers having a center to center distance of about 1834 $\mu$m or less, and the eight single-mode optical fibers having a cladding outer diameter of about 125.0 $\mu$m±0.1 $\mu$m.

The present invention is further directed to a fiber optic ribbon including twelve single-mode optical fibers, the twelve single-mode optical fibers having a core, a cladding, and a coating, the twelve single-mode optical fibers being associated with a curable matrix, a width of the ribbon being about 3220 $\mu$m or less, a height of the ribbon being about 360 $\mu$m or less, the ribbon having a planarity of about 75 $\mu$m or less, the ribbon having distal single-mode optical fibers, the distal single-mode optical fibers having a center to center distance of about 2882 $\mu$m or less, and the twelve single-mode optical fibers having a cladding outer diameter of about 125.0 $\mu$m±0.1 $\mu$m.

The present invention also includes a fiber optic pigtail including at least one single-mode optical fiber, the at least one single-mode optical fiber having a core, a cladding, a coating, and a first end, at least one ferrule being attached to the first end of at least one single-mode optical fiber, the single-mode optical fiber having a cladding outer diameter of about 125.0 $\mu$m±0.3 $\mu$m, a core to cladding concentricity of about 0.2 $\mu$m or less, and a mode-field diameter of 9.2 $\mu$m±0.3 $\mu$m at 1310 nm.

The present invention is also directed towards a fiber optic jumper cable including at least one single-mode optical fiber having a core, a cladding, a first end, and a second end, a first ferrule, a second ferrule, the first end of the at least one single-mode optical fiber being attached to the first ferrule and the second end of the at least one single-mode optical fiber being attached to the second ferrule, the at least one single-mode optical fiber having a cladding outer diameter of about 125.0 $\mu$m±0.3 $\mu$m, a core to cladding concentricity of about 0.2 $\mu$m or less, and a mode-field diameter of about 9.2 $\mu$m±0.3 $\mu$m at 1310 nm.

The present invention is also directed to a tight-buffered optical fiber assembly including at least one single-mode optical fiber having a core, a cladding, a first end, and a second end, a tight-buffered jacket, a first ferrule, a portion of the tight-buffered jacket surrounding a portion of the at least one single-mode optical fiber, the first end of the at least one single-mode optical fiber being attached to the first ferrule, and the at least one single-mode optical fiber having a cladding outer diameter of about 125.0 $\mu$m±0.3 $\mu$m, a core to cladding concentricity of about 0.2 $\mu$m or less, and a mode-field diameter of about 9.2 $\mu$m±0.3 $\mu$m at 1310 nm.

The present invention also includes a method of manufacturing a fiber optic assembly including the steps of selecting a plurality of single-mode optical fibers having a cladding outer diameter of about 125.0 $\mu$m±0.3 $\mu$m, and applying at least one flexible polymeric material to at least a portion of said plurality of single-mode optical fibers.

The present invention is also directed towards a flexible optical circuit including at least one single-mode optical fiber having a core, a cladding, a first end, and a second end, a first flexible substrate, a second flexible substrate, the at least one single-mode optical fiber being interposed between the first substrate and the second substrate, and the at least one single-mode optical fiber having a cladding outer diameter of about 125.0 $\mu$m±0.3 $\mu$m, a core to cladding concentricity of about 0.2 $\mu$m or less, and a mode-field diameter of about 9.2 $\mu$m±0.3 $\mu$m at 1310 nm.

BRIEF DESCRIPTION OF THE FIGS.

FIG. 1 is a partial isometric view of a fiber optic ribbon jumper cable according to the present invention.

FIG. 2 is a cross-sectional view of an exemplary ribbon of FIG. 1 taken at line 2—2.

FIG. 2a is a cross-sectional view of an exemplary optical fiber according to the present invention.

DETAILED DESCRIPTION OF THE INVENTION

Figure 2B:
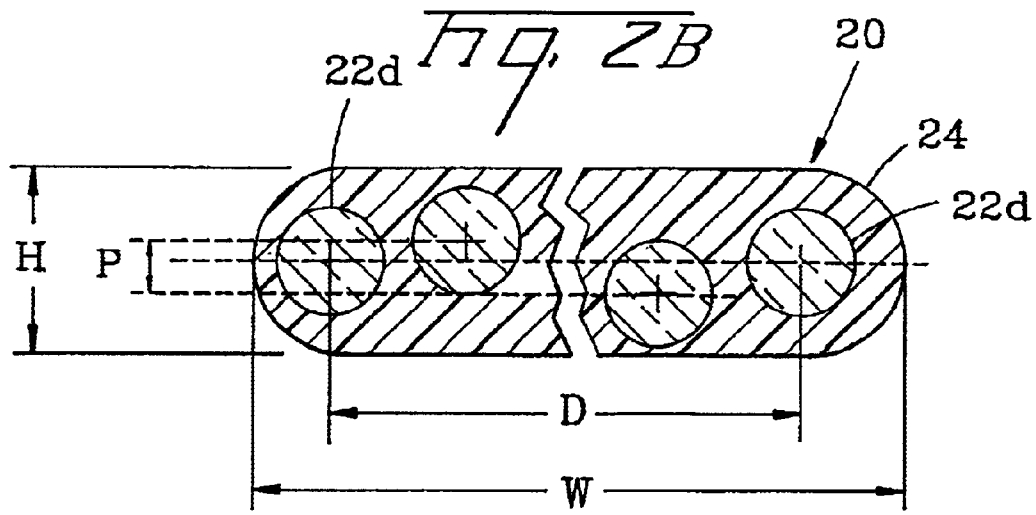
FIG. 2b is a cross-sectional view of an explanatory ribbon.

The concepts of the present invention are applicable to, for example, single-mode optical fibers that are tight-buffered, loose, colored, uncolored, bundled, ribbonized, interconnect assemblies having, for example, simplex connector(s) and/or multiplex connector(s), optical circuits, combinations thereof or other suitable interconnect components and/or assemblies. In one embodiment, at least a portion of the interconnect component(s) and/or assemblies of the present invention are associated with a flexible polymeric material. An exemplary embodiment according to one embodiment of the present invention is depicted in FIG. 1. A portion of a jumper cable 10 includes a fiber optic ribbon 20(hereinafter ribbon 20), strength component 12, an outer jacket 14, and ferrules 16. However, cable 10 may include other suitable numbers of ferrules 16 attached to one or both ends of ribbon 20. Cable 10 may also be suitable for splicing as a pigtail at one or both ends of ribbon 20. Ribbon 20, shown in FIG. 2, includes at least two optical fibers 22 associated with at least flexible polymeric material, for example, a UV curable matrix 24. Each optical fiber 22 is operative to transmit light and includes a core 22a, a cladding 22b and a coating 22c. Optical fibers 22 of the present invention are selected based on geometric properties and/or characteristics for use in ribbon 20. As illustrated in FIG. 2a, geometric properties and/or characteristics of optical fibers 22 can include a cladding outer diameter D1, a core to cladding concentricity C1 (exaggerated for clarity) and/or a mode-field diameter D2 (not illustrated). The mode-field diameter is generally greater than a diameter of core 22a and is a measure of the beam width of light propagating in optical fiber 22. The present invention may also include dimensional parameters of ribbon 20. As illustrated in FIG. 2b, parameters of ribbon 20 can include a ribbon width W, a ribbon height H, a ribbon planarity P and/or a center to center distance D of distal optical fibers 22d of ribbon 20.

Optical interconnect components and/or assemblies generally have signal losses. In other words, optical interconnect applications between, for example, two optical fibers generally results in an optical insertion loss, that is, a fraction of the signal light that is lost. In general, optical insertion loss is an undesired result. Optical insertion loss is, generally, measured in decibels for a mated pair of optical connectors. Some causes of optical insertion loss include reflection at the end faces of optical fibers or misalignment of the cores of the optical fibers.

Effective coupling of optical signals depends upon the alignment between the connected fibers or devices. The end of the optical fiber should be optically aligned accurately with the mating optical fiber end or device. If the elements are not mated in a coaxial and precisely spaced relationship, signal quality is lowered due to a decrease in transmitted light, i.e., optical insertion loss. Some known interconnect assemblies are incapable of assuring the alignment needed for high quality signal transmissions, while others rely upon expensive and complex structural arrangements or sensitive labor-intensive adjustments for optical alignment.

For reasonably low insertion losses to be achieved, the centers of the fiber end faces must, therefore, be registered. Furthermore, due to the high numerical aperture of many optical waveguides, fiber alignment is especially important. Since light diverges from the fiber axis as it travels through a fiber interface, some light is lost if the end faces of the fibers are separated; therefore, the end faces of the fibers should also be maintained in virtual contact. Fiber-to-fiber separation also implies an insertion loss due to Fresnel reflections at one of the two glass end interfaces.

The present inventors have discovered that by selecting optical fibers 22, connectors and/or components based on predetermined geometric properties and/or characteristics the insertion losses of interconnect components and/or assemblies can be significantly reduced. More specifically, the inventors have discovered that insertion loss of interconnect components and/or assemblies can be improved by selecting optical fibers, connectors and/or components having a predetermined range of geometric tolerances and/or performance characteristics. For example, by selecting optical fibers 22 having, for example, a predetermined range of cladding outer diameter D1, core to cladding concentricity C1, and/or mode-field diameter from a general population of optical fibers, then insertion losses can be reduced. In other words, the present inventors have discovered that interconnect optical performance with photonic devices can be significantly improved by the predetermined control, selection, and/or optimization of interconnect components based on geometric properties and/or characteristics.

Optical fibers 22, for example, Corning SMF-28 single-mode optical fibers, are manufactured to consistent geometric properties for optimum performance and reliability. However, relatively small geometric variability results during the manufacturing process of the optical fibers 22, however this variability does not affect the performance or reliability of the optical fibers 22. For example, a general population of single-mode optical fibers 22 can include the following acceptable ranges of geometric properties and/or performance characteristics from the manufacturer: cladding outer diameter D1 being $125.0\,\mu m \pm 1.0\,\mu m$; core to cladding concentricity C1 being $0.5\,\mu m$ or less; and mode-field diameter D2 being about $8.80\,\mu m$ to about $9.60\,\mu m$ at 1310 nm. Optical fibers 22 arrive from the optical fiber manufacturer in long lengths on spools. Generally, the optical fiber manufacturer measures and records geometric and performance data regarding the fiber on an individual spool and this data is associated with an identification number of the optical fiber. Thus, a downstream manufacturer packaging optical fibers into various components need not measure the geometric and performance data associated with the optical fiber, but may select components for high performance interconnect applications based upon known geometric properties and/or performance characteristics.

However, a downstream manufacturer may measure end face or cross-sectional optical fiber geometry by using a commercially available optical fiber geometry measurement system. For example, as described in publication MM28 issued Jan. 2000 by Corning Inc. and incorporated herein by reference, a high-resolution image of the fiber end-face is magnified and digitized by the measurement system. Both the outer cladding edge and the core edge are fit with mathematical functions to define the fiber's end-face geometry. This enables the measure of cladding diameter, cladding non-circularity, core non-circularity and core to cladding concentricity. More particularly, the optical fiber ends are stripped of coating (approximately 2 cm beyond the end of the fiber) and prepared with end angles less than one degree with near-perfect mirror surfaces. The prepared optical fiber ends are placed in the input and output stages of the optical fiber geometry measurement system. The system automatically positions the output end of the fiber for image sharpness and adjusts the intensity of both the bright-field and core illuminators. Cladding edge and core edge data then are taken and fit to the appropriate algorithms. The results are automatically calculated and reported for cladding diameter, cladding non-circularity, core non-circularity, and core to cladding concentricity.

Optical fibers 22 of the present invention may be, for example, ribbonized in a curable matrix as depicted in FIG. 2. Ribbon 20 is explanatory and can include various numbers of optical fibers 22, for instance, two, four, six, eight, twelve, sixteen, twenty-four, thirty-two, forty, forty-eight or other suitable numbers. In one embodiment, ribbon 20 includes at least two single-mode optical fibers 22 selected to include a cladding outer diameter of about 125.0 $\mu$m±0.3 $\mu$m and associated with a curable matrix. Ribbon 20 may also be a portion of a ribbon stack, for example, a ribbon stack as disclosed in U.S. Pat. No. 6,192,178 and/or U.S. Ser. No. 09/789,048, both of which are incorporated by reference. However, ribbons of the present invention may be used in other suitable ribbon stacks. Optical fibers and/or ribbons of the present invention may also be a portion of a fiber optic cable.

Ribbon 20 may also include dimensional parameters for allowing, for example, ribbon 20 to be easily inserted into ferrule 16. FIG. 2b depicts dimensional parameters of an exemplary ribbon. Dimensional parameters of ribbon 20 can include a ribbon width W and a ribbon height H as depicted, which includes matrix 24. Ribbon planarity P is defined as a lateral distance between centers of optical fibers 22 that are at the greatest distance from the centerline of ribbon 20. Planarity P can be measured above and/or below the centerline of ribbon 20 with respect to optical fibers 22 of ribbon 20. Dimensional parameters can also include a center to center distance D of the distal optical fibers 22d of ribbon 20. Illustratively, an eight fiber ribbon can include width W of about 2172 $\mu$m or less, height H of about 360 $\mu$m or less, planarity P of about 50 $\mu$m or less, and a distance D of about 1834 $\mu$m or less. A twelve fiber ribbon can include width W of about 3220 $\mu$m or less, height H of about 360 $\mu$m or less, planarity P of about 75 $\mu$m or less, and a distance D of about 2882 $\mu$m or less.

Optical fibers 22 of ribbon 20 may also include a coloring material (not shown) generally covering coating 22c to help a craftsman identify individual optical fibers 22. This coloring material may add a few microns to the outer diameter of optical fiber 22. As the number of optical fibers 22 in ribbon 20 increases, distance D, the center to center distance of distal optical fibers 22d, may also increase due to the cumulative effects of the coloring material. For example, if the coloring material adds about 6–8 microns to the diameter of each 250-micron optical fiber of a forty-fiber ribbon, the coloring material alone may add about 240–320 microns to distance D. The distance added by the coloring material could result in misalignment of the optical fibers when attaching a ferrule to a ribbon, generally an undesired result. One way of overcoming this difficulty is to alternate colored optical fibers between uncolored optical fibers, however this solution may add about 120–160 microns in coloring material to distance D. Another embodiment of the present invention involves selecting optical fibers 22 so that an outer diameter of coating 22c of optical fiber 22 is less than about 250 microns, more preferably less than about 245 microns, and most preferably about 240 microns or less. Therefore, when the coloring material is applied to optical fiber 22 the overall outer diameter of the optical fiber is about 250 microns or less and distance D will remain in a suitable range.

Figure 3:
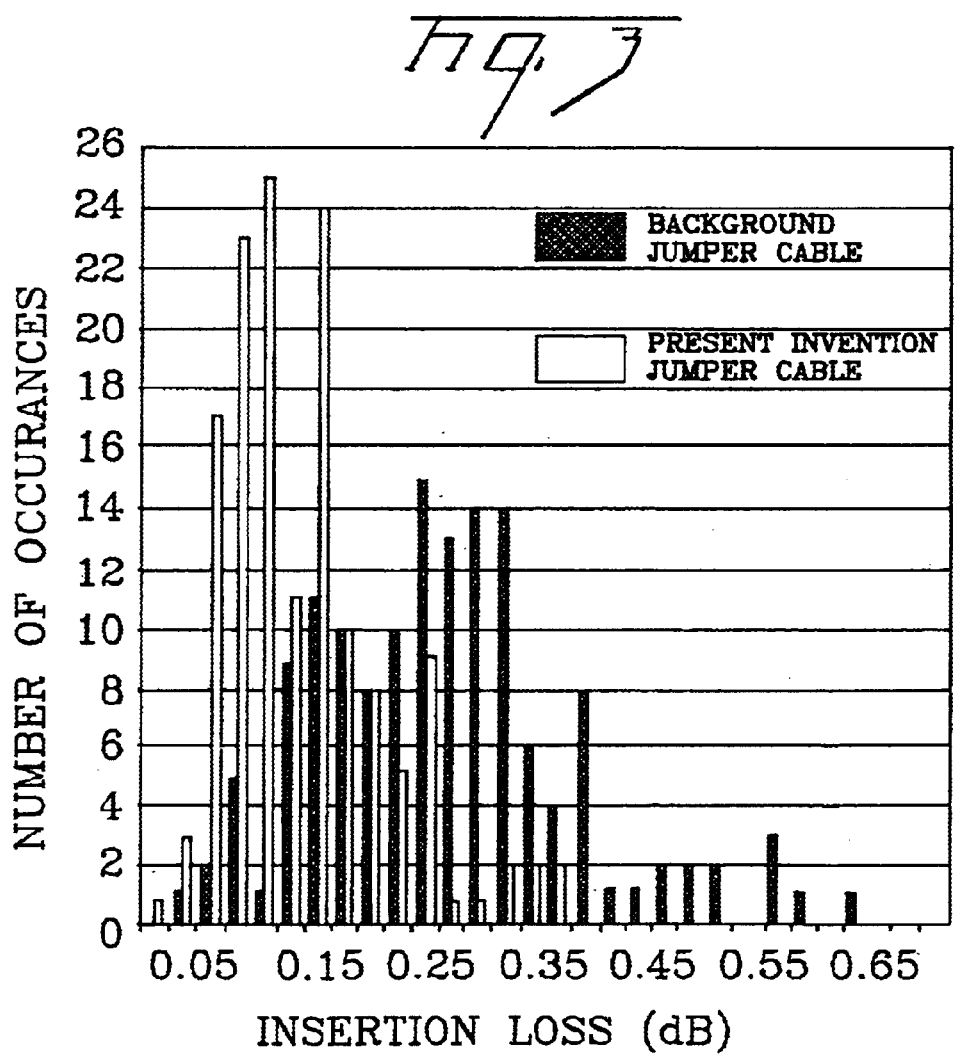
FIG. 3 illustrates a representative histogram indicating comparative data regarding the insertion loss of a background jumper cable versus a jumper cable according to the present invention.

FIG. 3 illustrates the performance characteristics of background jumper cables versus jumper cables according to the present invention represented in a histogram format. Background jumper cables have optical fibers randomly selected from the general population of optical fibers available from the optical fiber manufacturer. More specifically, FIG. 3 illustrates insertion losses measured in decibels (dB), that is, signal losses in the connections and/or splices of interconnect components and/or assemblies. In general, an optical fiber has a certain attenuation loss due to characteristics inherent in the optical fiber, for example, reflectivity or imperfections in the fiber, which can be measured independently from insertion losses.

The comparative data will now be more fully explained. Eighteen samples of eight-fiber jumper cables 10 of the present invention were prepared, measured and compared with eighteen samples of background eight-fiber jumper cables. Testing revealed that jumper cable 10 of the present invention had relatively low insertion losses compared with the relatively high insertion losses of the background jumper cables. Moreover, the jumper cables 10 of FIG. 3 include a tighter distribution of insertion losses, about 0.00 dB to about 0.37 dB, compared with the relatively wide distribution of insertion loss, about 0.02 dB to about 0.64 dB, for the background jumper cables.

Jumper cables 10 of the present invention were measured included optical fibers 22 selected from a predetermined range of geometric properties and/or performance characteristics. More specifically, optical fibers 22 included a cladding outer diameter D1 being about 125.0 $\mu$m±0.1 $\mu$m, a core to cladding concentricity C1 being about 0.2 $\mu$m or less, and a mode-field diameter D2 being about 9.2 $\mu$m±0.2 $\mu$m at an optical source wavelength of 1310 nm.

Cables 10 and background cables included ferrules 16 attached to each end of ribbon 20, allowing ribbon 20 to be connected and/or disconnected to, for example, a connector in an optical system. Cable 10 and the background cables tested also included strength component 12 and outer jacket 14 for environmental protection. Strength component 12 may be aramid fibers, for example, kevlar® fibers for providing tensile strength to cable 10. Cable 10 may also be constructed according U.S. Ser. No. 09/107,676, which is incorporated herein by reference. A high-performance ferrule 16 was used in both cables 10 and the background cables tested, more specifically, a MT Elite™ ferrule available from USConec® of Hickory, N.C., was connected to an eight-fiber ribbon 20 of the present invention and the background eight-fiber ribbons, however other suitable ferrules may be used. Ferrules 16 were polished to an eight-degree angle. Ferrule 16 was attached to a connector, more specifically, a MTP connector (not shown) also available from USConec®, however other suitable connectors may be used. Both cables 10 and background cables were tested for insertion loss at a source wavelength of 1550 nm.

As illustrated in FIG. 3, the background jumper cables revealed relatively high insertion losses. More specifically, the background jumper cables included an average optical fiber insertion loss of 0.26 dB at 1550 nm, a maximum insertion loss of 0.64 dB, and a minimum insertion loss of 0.02, and a standard deviation of about 0.09 dB.

On the other hand, the relatively low insertion loss performance of the cables of the present invention was comparatively and surprisingly superior to the performance of the background cables. The average optical fiber insertion loss of the present invention that was half the value compared with the average optical fiber insertion loss of the background cables. More specifically, jumper cables 10 of the present invention had an average optical fiber insertion loss of 0.13 dB at 1550 nm, a maximum insertion loss of 0.37 dB, a minimum insertion loss of 0.0 dB, and a standard deviation of about 0.06 dB. The average optical fiber back reflectance of jumper cables 10 were also measured; the back reflectance at 1550 nm was −63 dB, with a maximum back reflectance of −55 dB, a minimum back reflection of −72 dB, and a standard deviation of about 4 dB.

The inventors believe that other ranges of geometric properties and/or characteristics, alone or in combination with others, may provide improved optical performance. For example, a cladding outer diameter D1 may be about 125.0 μm±0.3 μm and still provide relatively low insertion losses. Likewise, a core to cladding concentricity C1 being about 0.30 μm or less, and/or a mode-field diameter D2 being about 9.20 μm±0.30 μm at 1310 nm. However, the inventors believe that some specific geometric properties and/or characteristics affect performance more than others do. The inventors have discovered a ranking system of geometric properties and/or characteristics, which improve optical interconnect performance. The inventors rank the following geometric properties and/or characteristics in the following order of importance for optical interconnect performance: cladding outer diameter D1; core to cladding concentricity C1; and mode-field diameter D2.

Moreover, the inventors also believe that other geometric properties and/or characteristics, alone or in combination with others, may provide improved optical performance. For instance, optical fibers may also be selected according to a core non-circularity, a cladding non-circularity, coating geometry, and/or a cutoff wavelength.

For example, core and cladding non-circularity of optical fibers 22 may be selected to be about 0.5% or less. Measuring the outside diameter of coating 22c and coating concentricity may be measured, for example, using the Ray-Traced Side View Method as described in publication MM29 issued Mar. 2000 by Corning Inc., which is incorporated herein by reference. The boundaries between the coating and the cladding can be determined from a diffraction pattern created when a laser scans the transparent protective coating. The coated fiber is modeled as a series of nearly concentric cylinders through which ray traces are performed, yielding a set of equations that are then solved for center and diameter of each layer.

Likewise, optical fibers 22 may be selected by a cutoff wavelength, for example, about 1230 nm or less. Cutoff wavelength is the minimum wavelength where an optical fiber will support only one propagating mode. If the system operating wavelength is below the cutoff wavelength, multimode operation may take place and the introduction of an additional source of dispersion may limit the fiber's information carrying capacity. The physical deployment of the optical fiber plays a role in defining the region of single-mode operation. Typical deployment conditions for cabled fibers in the field, with varying lengths and bend configurations, will typically shift the actual cutoff to shorter wavelengths than the measured fiber cutoff wavelength. Therefore, the cabled fiber cutoff wavelength is of more interest to the user because it is more accurate representation of the cutoff wavelength that can be expected in actual use. Because cabling the fiber tends to shift the cutoff to shorter wavelengths, a conservative estimate of cabled cutoff wavelength may be made by measuring uncabled fiber in the cable cutoff configuration.

For example, as described in publication MM15 issued Feb. 2000 by Corning Inc., which is incorporated herein by reference, cutoff wavelength may be measured by the transmitted power method. In this method, the transmitted spectral power versus wavelength for the sample fiber is compared to the transmitted spectral power versus wavelength for two meters of a multimode fiber by applying the equation:

$$A_m(\lambda) = 10\log_{10}\frac{P_s(\lambda)}{P_m(\lambda)} \text{ in dB}$$

where:
$A_m$=attenuation difference
$P_s$=power from the single-mode fiber
$P_m$=power from the multi-mode fiber The multimode fiber is used as a reference fiber to permit mapping out the spectral response of the measurement system. To determine cutoff wavelength, $A_m(\lambda)$ is plotted against wavelength. A straight line is fitted to the long wavelength backslope of the plot and dropped 0.1 dB. A subsequent intersection between the dropped straight line and the $A_m(\lambda)$ curve denotes the cutoff wavelength. For this measurement, the optical fiber ends are stripped of coating and prepared with end angles less than two degrees with a near perfect mirror surface. Cladding mode stripping is also provided.

The manufacture of embodiments according to the present invention can be accomplished by operation of the following exemplary process. Selecting single-mode optical fiber(s). The selection process of optical fibers, for example, may include: a cladding outer diameter of about 125.0 μm±0.3 μm; a core to cladding concentricity of about 0.2 μm or less; a mode-field diameter of about 9.2 μm±0.3 μm at 1310 nm; or other suitable geometric properties and/or characteristics of the optical fiber(s). Applying a flexible polymeric material to at least a portion of the single-mode optical fiber(s). Flexible polymeric material may include, for example, films, foils, foams, membranes, wovens or non-wovens, orientated or non-orientated polymers, curable matrices, mylar, polyimide or polyamide materials, thermoplastic materials, thermoset materials, or acrylate materials, but generally exclude rigid materials such as rigid silicon or glass substrates that contact all the optical fibers in exact fixed locations. Flexible polymeric material may also include metal/polymer, e.g., a copper-clad mylar composite that may or may not carry electrical currents or other suitable composite materials. An optical/electrical circuit may be used, for example, in automotive or aircraft applications. The flexible polymeric material may be use suitable adhesives for bonding components of the optical circuit, however the optical circuit may be constructed without adhesives. In one method of manufacture, the flexible polymeric material is a UV curable matrix and the method of manufacturing further includes the step of curing the matrix. Other methods of manufacture include extruding a jacket around a strength component and at least one single-mode optical fiber or attaching a ferrule to at least one of the single-mode optical fibers.

Figure 4:
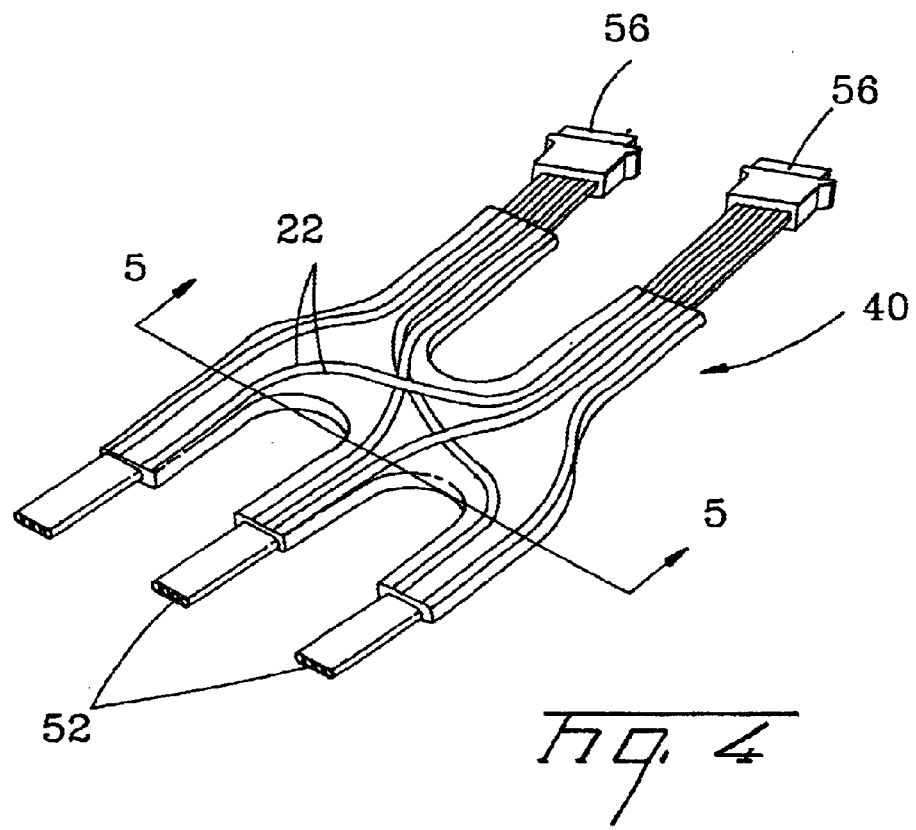
FIG. 4 is an isometric view of an optical circuit, which is another embodiment according to the present invention.
Figure 5:
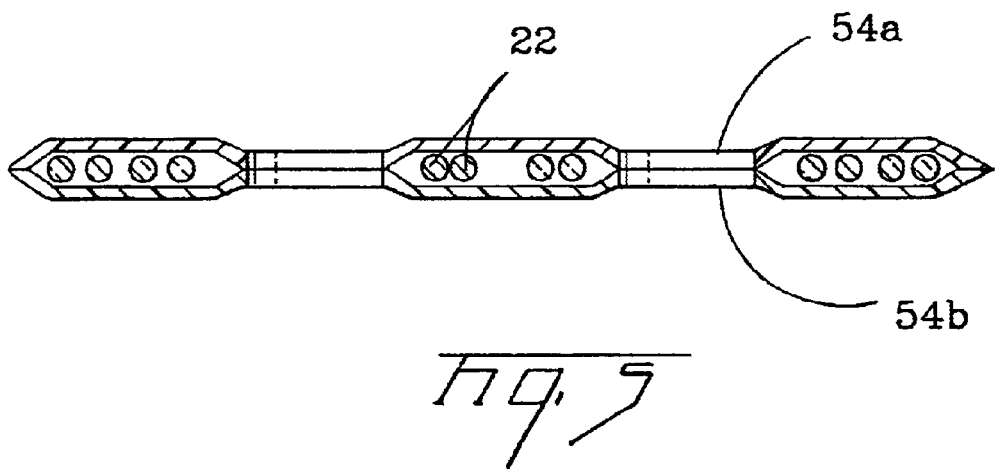
FIG. 5 is a cross-sectional view of the embodiment of FIG. 4 taken along line 5—5.

The concepts of the present invention can be practiced in other forms. For example, an exemplary optical circuit 40 is illustrated in FIGS. 4 and 5. As described in conjunction with the embodiments of FIG. 1, optical circuit 40 includes at least one optical fiber 22 interposed between two substrates 54a,54b. Optical fibers 22 may be interposed between flexible polymeric substrates 54a,54b, for example, a Concours™ optical circuit available from USConec® of Hickory, N.C. However, optical fiber 22 may be used in a planar optical circuit having v-grooves or other suitable optical circuits. Ferrule 56 may be attached to an end 52 of optical fiber 22, however end 52 of fiber 22 may be unterminated for splicing, fusing or other connectorization. Optical circuit 40 can be used, for example, in 1×N splitters, optical switching, cross-connects, wavelength-division multiplexing or demultiplexing, compact ribbon to simplex fan-outs, and parallel optical interface applications. Additionally, optical circuit 40 may include other types of optical fibers, for example, multi-mode, pure-mode, erbium doped, LEAF® optical fiber available from Corning, Inc and/or polarization maintaining fiber.

Many modifications and other embodiments of the present invention, within the scope of the appended claims, will become apparent to a skilled artisan. For example, the optical fibers could be attached to a variety of connectors such as single-fiber, duplex, planar, twist-on, polarizing or small form-factor in various configurations. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to optical ribbons, jumper cables, and optical circuits but the inventive concepts of the present invention are applicable to other optical interconnect components and/or assemblies as well.

That which is claimed:

1. A fiber optic assembly comprising:
   a plurality of single-mode optical fibers, said plurality of single-mode optical fibers having a core, a cladding, and a coating;
   at least one flexible polymeric material, said flexible polymeric material being associated with at least a portion of the plurality of single-mode optical fibers; and
   said plurality of single-mode optical fibers having a cladding outer diameter of about 125.0 μm±0.3 μm.

2. The fiber optic assembly of claim 1, said flexible polymeric material being selected from the following: films, foils, foams, membranes, wovens, non-wovens, orientated or non-orientated polymers, curable matrices, mylars, polyimides, polyamides, thermoplastics, thermosets, metal/polymer composites, or acrylates.

3. The fiber optic assembly of claim 1, said plurality of single-mode optical fibers having a cladding outer diameter of about 125.0 μm±0.1 μm.

4. The fiber optic assembly of claim 1, said plurality of single-mode optical fibers having a core to cladding concentricity of about 0.2 μm or less.

5. The fiber optic assembly of claim 1, said plurality of single-mode optical fibers having a mode-field diameter of about 9.2 μm±0.3 μm at 1310 nm.

6. The fiber optic assembly of claim 1, said flexible polymeric material being a curable matrix.

7. The fiber optic assembly of claim 6, said curable matrix forming a portion of a fiber optic ribbon.

8. The fiber optic ribbon of claim 7, said plurality of single-mode optical fibers having a coating outer diameter of about 245 microns or less.

9. The fiber optic ribbon of claim 7, said fiber optic ribbon being a portion of a ribbon stack.

10. The fiber optic ribbon of claim 7, said fiber optic ribbon being a portion of a fiber optic cable.

11. The fiber optic ribbon of claim 7, said ribbon having the plurality of single-mode optical fibers selected from the following numbers of single-mode optical fibers: four, six, eight, twelve, sixteen, twenty-four, thirty-two, forty, or fourty-eight.

12. The fiber optic ribbon of claim 7, said plurality of single-mode optical fibers having a core to cladding concentricity of about 0.2 μm or less.

13. The fiber optic ribbon of claim 7, said plurality of single-mode optical fibers having a mode-field diameter of about 9.2 μm±0.3 μm at 1310 nm.

14. The fiber optic ribbon of claim 7, said ribbon being a portion of an interconnect assembly further including at least one ferrule, said at least one ferrule being attached to at least one of the plurality of single-mode optical fibers.

15. The fiber optic ribbon of claim 7, said plurality of single-mode optical fibers having a cladding outer diameter of about 125.0 μm±0.1 μm.

16. The fiber optic ribbon of claim 15, said ribbon being a portion of a ribbon stack.

17. The fiber optic ribbon of claim 15, said ribbon being a portion of a fiber optic cable.

18. The fiber optic ribbon of claim 15, said ribbon being part of an optical circuit.

19. The fiber optic ribbon of claim 15, said ribbon having eight single-mode optical fibers.

20. The fiber optic ribbon of claim 15, said ribbon having twelve single-mode optical fibers.

21. The fiber optic ribbon of claim 15, said ribbon having twenty-four single-mode optical fibers.

22. The fiber optic ribbon of claim 15, said ribbon having the plurality of single-mode optical fibers selected from the following numbers of single-mode optical fibers: four, six, eight, twelve, sixteen, twenty-four, thirty-two, forty, or forty-eight.

23. A fiber optic ribbon comprising:
   eight single-mode optical fibers, said eight single-mode optical fibers having a core, a cladding, and a coating;
   a curable matrix, said matrix being associated with said eight single-mode optical fibers;
   a width of said ribbon being about 2172 μm or less;
   a height of said ribbon being about 360 μm or less;
   said ribbon having a planarity of about 50 μm or less;
   said ribbon having distal single-mode optical fibers, said distal single-mode optical fibers having a center to center distance of about 1834 μm or less; and
   said eight single-mode optical fibers having a cladding outer diameter of about 125.0 μm±0.1 μm.

24. The fiber optic ribbon of claim 23, said eight single-mode optical fibers having a core to cladding concentricity of about 0.2 μm or less.

25. The fiber optic ribbon of claim 23, said eight single-mode optical fibers having a mode-field diameter of about 9.2 μm±0.3 μm at 1310 nm.

26. The fiber optic ribbon of claim 23, said ribbon being a portion of a ribbon stack.

27. The fiber optic ribbon of claim 23, said ribbon being a portion of a fiber optic cable.

28. The fiber optic ribbon of claim 23, said ribbon being a portion of an optical circuit.

29. The fiber optic ribbon of claim 23, said eight single-mode optical fibers having a coating outer diameter of about 245 microns or less.

30. A fiber optic ribbon comprising:
   twelve single-mode optical fibers, said twelve single-mode optical fibers having a core, a cladding, and a coating;
   a curable matrix, said matrix being associated with said twelve single-mode optical fibers;
   a width of said ribbon being about 3220 μm or less;
   a height of said ribbon being about 360 μm or less;
   said ribbon having a planarity of about 75 μm or less;
   said ribbon having distal single-mode optical fibers, said distal single-mode optical fibers having a center to center distance of about 2882 μm or less; and
   said twelve single-mode optical fibers having a cladding outer diameter of about 125.0 μm±0.1 μm.

31. The fiber optic ribbon of claim 30, said twelve single-mode optical fibers having a core to cladding concentricity of about 0.2 µm or less.

32. The fiber optic ribbon of claim 30, said twelve single-mode optical fibers having a mode-field diameter of about 9.2 µm±0.3 µm at 1310 nm.

33. The fiber optic ribbon of claim 30, said ribbon being a portion of a ribbon stack.

34. The fiber optic ribbon of claim 30, said ribbon being a portion of a fiber optic cable.

35. The fiber optic ribbon of claim 30, said ribbon being a portion of an optical circuit.

36. The fiber optic ribbon of claim 30, said twelve single-mode optical fibers having a coating outer diameter of about 245 microns or less.

37. A fiber optic pigtail comprising:
at least one single-mode optical fiber, said at least one single-mode optical fiber having a core, a cladding, a coating, and a first end;
at least one ferrule, said first end of at least one single-mode optical fiber being attached to said at least one ferrule; and
said single-mode optical fiber having a cladding outer diameter of about 125.0 µm±0.3 µm, a core to cladding concentricity of about 0.2 µm or less, and a mode-field diameter of 9.2 µm±0.3 µm at 1310 nm.

38. The fiber optic pigtail of claim 37, said at least one single-mode optical fiber having a cladding outer diameter of about 125.0 µm±0.1 µm.

39. The fiber optic pigtail of claim 37, said at least one single-mode optical fiber being one of a plurality of single-mode optical fibers in a ribbon having a curable matrix, said plurality of single-mode optical fibers having a cladding outer diameter of 125.0 µm±0.1 µm.

40. The fiber optic pigtail of claim 39, said plurality of single-mode optical fibers selected from the following four, six, eight, twelve, sixteen, twenty-four, thirty-two, forty, or forty-eight.

41. The fiber optic pigtail of claim 39, said pigtail having at least one ferrules attached to said plurality of single-mode optical fibers.

42. The fiber optic pigtail of claim 37, an outer jacket generally surrounding a portion of a strength component and a portion of said at least one single-mode optical fiber.

43. The fiber optic pigtail of claim 37, said at least one single-mode optical fiber being tight-buffered.

44. The fiber optic ribbon of claim 37, said at least one single-mode optical fiber having a coating outer diameter of about 245 microns or less.

45. A fiber optic jumper cable comprising:
at least one single-mode optical fiber having a core, a cladding, a first end, and a second end;
a first ferrule;
a second ferrule;
said first end of said at least one single-mode optical fiber being attached to said first ferrule and said second end of said at least one single-mode optical fiber being attached to said second ferrule;
said at least one single-mode optical fiber having a cladding outer diameter of about 125.0 µm±0.3 µm, a core to cladding concentricity of about 0.2 µm or less, and a mode-field diameter of about 9.2 µm±0.3 µm at 1310 nm.

46. The fiber optic jumper cable of claim 45, said at least one single-mode optical fiber having a cladding outer diameter of about 125.0 µm±0.1 µm.

47. The fiber optic jumper cable of claim 45, said at least one single-mode optical fiber being one of a plurality of single-mode optical fibers in a ribbon having a first end, a second end, and a curable matrix associated with said plurality of single-mode optical fibers, said plurality of single-mode optical fibers having a cladding outer diameter of 125.0 µm±0.1 µm.

48. The fiber optic jumper cable of claim 47, said plurality of single-mode optical fibers selected from the following four, six, eight, twelve, sixteen, twenty-four, thirty-two, forty, or forty-eight.

49. The fiber optic jumper cable of claim 47, said fiber optic cable having a plurality of ferrules, said plurality of ferrules being attached to either end of at least one of said plurality of single-mode optical fibers.

50. The fiber optic jumper cable of claim 45, said cable having an outer jacket generally surrounding a portion of a strength component and a portion of said at least one single-mode optical fiber.

51. The fiber optic jumper cable of claim 45, said at least one single-mode optical fiber being tight-buffered.

52. A tight-buffered optical fiber assembly comprising:
at least one single-mode optical fiber having a core, a cladding, a first end, and a second end;
a tight-buffered jacket;
a first ferrule;
a portion of said tight-buffered jacket surrounding a portion of said at least one single-mode optical fiber;
said first end of said at least one single-mode optical fiber being attached to said first ferrule; and
said at least one single-mode optical fiber having a cladding outer diameter of about 125.0 µm±0.3 µm, a core to cladding concentricity of about 0.2 µm or less, and a mode-field diameter of about 9.2 µm±0.3 µm at 1310 nm.

53. The tight-buffered optical fiber assembly of claim 52, said at least one single-mode optical fiber having a cladding outer diameter of about 125.0 µm±0.1 µm.

54. The tight-buffered optical fiber assembly of claim 52, said assembly including a second ferrule; said second end of said at least one single-mode optical fiber being attached to said second ferrule.

55. The tight-buffered optical fiber assembly of claim 52, said tight-buffered optical fiber being a portion of a breakout cable.

56. A method of manufacturing a fiber optic assembly comprising the steps of:
selecting a plurality of single-mode optical fibers having a cladding outer diameter of about 125.0 µm±0.3 µm; and
applying at least one flexible polymeric material to at least a portion of said plurality of single-mode optical fibers.

57. The method of manufacturing a fiber optic assembly of claim 56, said flexible polymeric material being a curable matrix and further comprising the step of curing said matrix.

58. The method of manufacturing a fiber optic assembly of claim 56, said step of selecting further comprising selecting said plurality of single-mode optical fibers having a cladding outer diameter of about 125.0 µm±0.1 µm.

59. The method of manufacturing a fiber optic assembly of claim 56, said step of selecting further comprising selecting said plurality of single-mode optical fibers having a core to cladding concentricity of about 0.2 µm or less.

60. The method of manufacturing a fiber optic assembly of claim 56, said step of selecting further comprising selecting said plurality of single-mode optical fibers having a mode-field diameter of about 9.2 µm±0.3 µm at 1310 nm.

61. The method of manufacturing a fiber optic assembly of claim 56, further comprising the step of extruding a jacket around a strength component and said plurality of single-mode optical fibers.

62. The method of manufacturing a fiber optic assembly of claim 56, further comprising the step of attaching a ferrule to at least one of said plurality of single-mode optical fibers.

63. A flexible optical circuit comprising:
- at least one single-mode optical fiber having a core, a cladding, a first end, and a second end;
- a first flexible polymeric material;
- a second flexible polymeric material;
- said at least one single-mode optical fiber being at least partially interposed between said first polymeric material and said second polymeric material; and
- said at least one single-mode optical fiber having a cladding outer diameter of about 125.0 $\mu$m ±0.3 $\mu$m, a core to cladding concentricity of about 0.2 $\mu$m or less, and a mode-field diameter of about 9.2 $\mu$m ±0.3 $\mu$m at 1310 nm.

64. The flexible optical circuit of claim 63, said flexible optical circuit further comprising at least one multi-mode optical fiber.

65. The flexible optical circuit of claim 63, said at least one single-mode optical fiber having a cladding outer diameter of about 125.0 $\mu$m±0.1 $\mu$m.

66. The flexible optical circuit of claim 63, said flexible optical circuit further comprising at least one ferrule, said at least one ferrule being attached to at least one end of said at least one single-mode optical fiber.

67. The flexible optical circuit of claim 63, said at least one single-mode optical fiber being one of a plurality of single-mode optical fibers, said plurality of single-mode optical fibers having a cladding outer diameter of 125.0 $\mu$m±0.1 $\mu$m.

* * * * *